Figure 1:
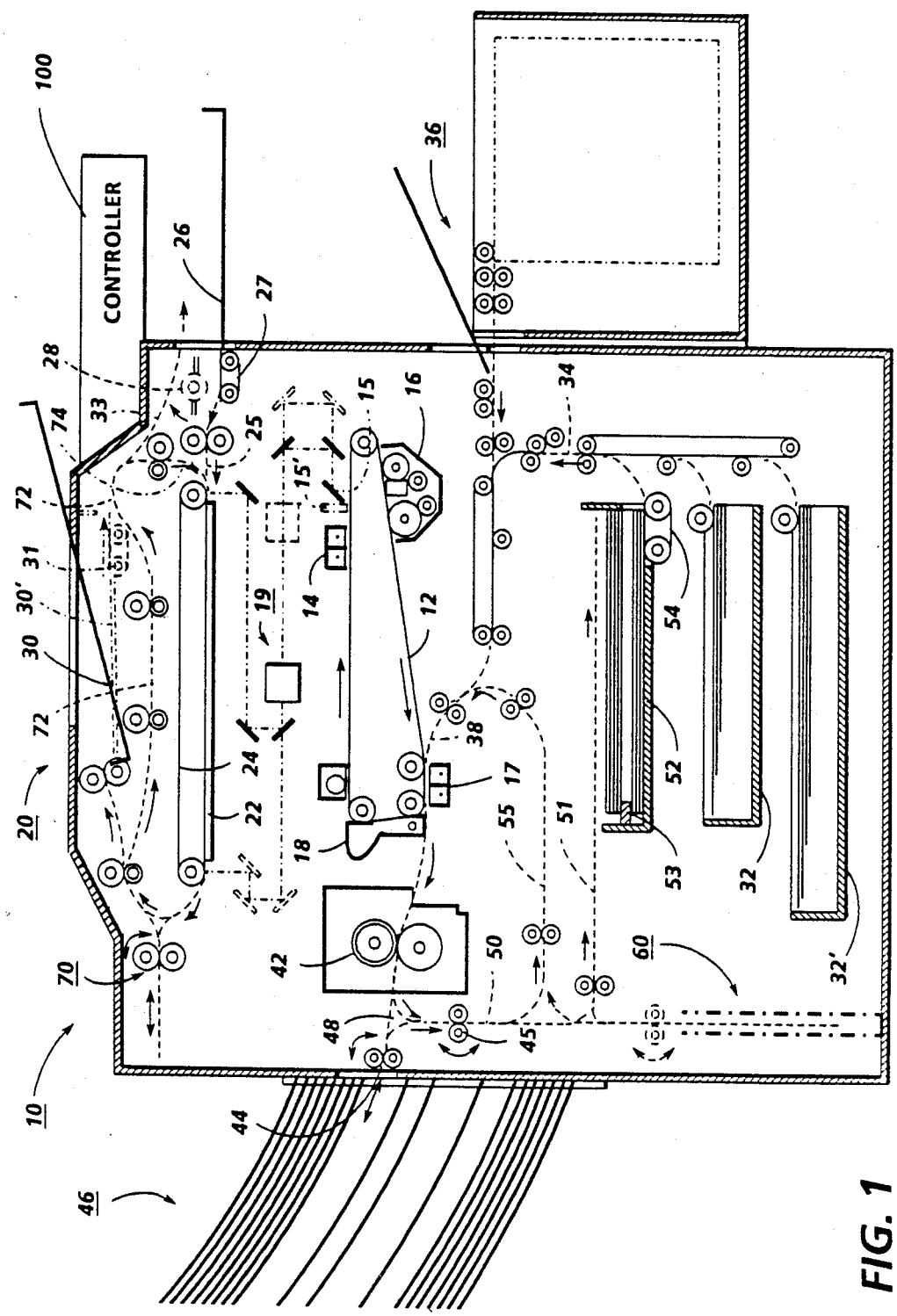

United States Patent [19]

Holmes et al.

[11] Patent Number: 4,949,949
[45] Date of Patent: Aug. 21, 1990

[54] HYBRID SEQUENCED DADF DUPLEXING SYSTEM

[75] Inventors: Maurice F. Holmes, Rochester; George J. Roller, Penfield; Steven R. Moore, Rochester, all of N.Y.

[73] Assignee: Xerox Corporation, Stamford, Conn.

[21] Appl. No.: 274,516

[22] Filed: Nov. 22, 1988

[51] Int. Cl.[5] .............................................. B65H 5/22
[52] U.S. Cl. ...................................... 271/3; 271/225; 271/184; 271/186; 271/902
[58] Field of Search .............. 271/3, 3.1, 65, 184–186, 271/902, 288, 298, 225; 270/58; 355/318, 319, 320, 323, 321

[56] References Cited

U.S. PATENT DOCUMENTS

| | | | |
|---|---|---|---|
| 4,179,215 | 12/1979 | Hage | 355/50 |
| 4,210,319 | 7/1980 | Hynes | 271/3.1 |
| 4,264,187 | 4/1981 | Rhodes, Jr. | 355/14 SH |
| 4,278,344 | 7/1981 | Sahay | 355/14 SH |
| 4,453,841 | 6/1984 | Bobick et al. | 400/126 |
| 4,456,236 | 6/1984 | Buddendeck | 271/3.1 |
| 4,536,078 | 8/1985 | Ziehm | 271/3 X |
| 4,561,772 | 12/1985 | Smith | 355/14 SH |
| 4,639,126 | 1/1987 | Bushaw et al. | 355/3 SH |
| 4,660,963 | 4/1987 | Stemmle | 355/24 |
| 4,777,498 | 10/1988 | Kasamura et al. | 346/150 |
| 4,787,616 | 11/1988 | Sasaki et al. | 271/298 X |

Primary Examiner—Kevin P. Shaver
Assistant Examiner—David H. Bollinger

[57] ABSTRACT

Disclosed is a hybrid copying system including a document feeder for a copier with a document bypass loop for copying documents in desired non-linear page sequences for improved copying efficiency, particularly for duplex copying. As shown, documents from a stacked set of document sheets may be fed to the copying station of the copier and then selectively returned directly back to the opposite side of the copying station for copying interleaved between the feeding of other documents fed from the stack, by a document return loop bypass path bypassing the stack and having a path length greater than the dimension of a document sheet. A duplex document which has been copied on one side may be moving in this return loop bypass path while another fed from the stack is being copied, and also be inverted by an integral inverter therein. A post-collation duplex copying system is provided with this document feeder for making duplex copies from duplex document sheets by making two separate buffer sets of plural copies on one side of copy sheets at a time of one side of two different document sheets fed by this document feeder and temporarily retaining and maintain these two separate buffer sets in a duplexing buffer tray in the copier and then copying onto the other sides thereof the other sides of documents fed through the document bypass loop and outputting these completed copies to be sorted by being separately placed in the bins of a multiple bin sorter at the output of the copier, and repeating this until all the documents have been copied. Various examples are disclosed for compatible hybrid simplex and/or duplex and pre or post collation copying, including alternative trayless duplexing and hybrid or non-sequential postcollation sorter operation.

4 Claims, 5 Drawing Sheets

HYBRID SEQUENCED DADF DUPLEXING SYSTEM

Cross-referenced are related disclosed subject matter applications of even date by the same first two inventors and the same assignee, U.S. Ser. Nos. 07-274,517 and 07-274,518.

There is disclosed herein an unconventional system for duplex (two sided) copying more efficiently, including an improved duplex automatic document handler (DADF), and a mating dual copy buffer set duplex buffer tray copying system, for duplex copying with improved efficiency. A system and combination of special document handing and copying algorithms is disclosed.

The disclosed document handler has a document return loop path loop, with a selectable inverter for duplex documents, providing desired non-directly-serially-sequential document page copying order or sequencing. For example, copying document pages in such page orders as 1, 3, 2, 4, 5, 7, 6, 8, etc., yet providing collated duplex copy sets therefrom. Such hydrid document copying orders or sequences may be copied onto a corresponding sequential train of copy sheets in an appropriate duplex copying copier, as disclosed, to provide high copying machine productivity yet correct page order copy output for the copy sheets being duplexed.

Many current document handling and duplex copier systems can suffer substantial productivity losses due in part to skipped copier pitches between the imaging of the respective sides or pages of the duplex documents and/or between the copying of the first and second sides of the copy sheets. That is, time wasted waiting for the time required for feeding the documents in an order needed for efficient copying, for feeding documents in the paths to and from the platen, or for turning duplex documents or copy sheets over (inversion), or for feeding copy sheets being duplexed along paths to and from the transfer station for receiving their first and second side images, and/or for maintaining proper collation of the copy and document sheets.

With the disclosed document handling system, the inversion and re-presentation time of one document sheet being copied may be shared or overlapped (interleaved) with copying of another document sheet, such that document pages may be presented for copying at the full copying rate of the copier without intervening time delays for maintaining proper collation or for inversions of the documents or the copy sheets being duplex copied, yet collation of both the copy sheets and the document sheets is provided at their outputs.

Also, with the disclosed system, a desirable high degree of structural commonality may be provided between a non-precollation automatic document handler or ADF, and a pre-collation recirculating document handler or RDH.

As indicated, the disclosed system and algorithms utilize a specially modified copier document handler, and a coordinated copier duplexing paper path, to provide duplex copying more efficiently. For example, during the time periods while duplex documents previously copied on one side are being inverted and returned to the platen for copying their opposite sides, one (or more) intervening document may be copied, to avoid productivity losses from non-copying time periods (skipped pitches). As shown herein, this may be accomplished by "breaking up" the normal directly sequential copying order of the document stack or job of documents into small cyclic copying cycles. Very importantly, this may be provided here by using an intermittent return bypass loop path for the duplex documents copied on one side but not yet copied on the other side. The documents are cyclically passed through this document inversion and return loop path without restacking. Duplex documents may be removed from the copier platen after they are copied on one side, and inverted by an inverter in that path, and returned back to the platen by this path without being restacked or returned to the document stack. Either simplex or duplex documents may be cyclicly reinserted into the document path to the platen AHEAD of other documents being fed from the job stack, that is, before other documents fed from the stack are copied, but AFTER at least one other document fed from the document input tray stack has been copied. A subsequent document may be copied while a previously copied document is being returned through this document return loop for subsequent copying out of the normal or collated order, and, in the case of a duplex document, also being inverted during that return loop. This document loop path bypasses the document input stacking and output or restacking tray, unlike a normal document recirculation loop path.

With this system, the copier does not normally have to wait (skip one or more copying pitches) for the time required to turn over and return to the platen a duplex document for copying its other side in a desired sequence. Productivity can therefore more closely approach 100%.

Note that desirably this disclosed document platen return bypass loop returns the document (with an inversion for a duplex document) back to the opposite side of the platen from which it was initially removed, i.e., back to the document input side. This disclosed document bypass path is preferably more than one document sheet dimension in length (in the feeding direction), so as to contain or hold one or more document sheets therein. Also, the particular cyclic algorithm used should match this loop path length. In the example shown herein, one doeument at a time is in this bypass loop, (in addition to the one on the platen) but it could be two, or even three, depending on the document bypass loop path length provided.

Considering some examples of prior art of particular interest as showing some structure similar to the particular document feeder embodiment or example here is Xerox Corporation U.S. Pat. No. 4,456,236 issued June 26, 1984 to M. Buddendeck, and IBM U.S. Pat. No. 4,264,187 issued Apr. 28, 1981 to Rhodes. Although structure of said U.S. Pat. No. 4,264,187 DH might be partially usable in an embodiment herewith, it does not teach or support the systems or algorithms herein, and has an important structural distinction and productivity disadvantage in that the document inverter is located at the document infeed station (see Col. 4). For automatic document handling (1-N operation for example) this would cause a significant productivity impact for duplex documents. Duplex documents, after having completed second side imaging, need to be inverted again before stacking in the output tray for proper collation when the output tray is at the location in this reference of "output tray 40". Conversely, if the output tray is located at "alternate exit tray 100", then all simplex documents will suffer this requirement. In this reference architecture, this would mean that the documents would have to be transported over the platen (imaging zone) again without making images - a major productivity loss. Also, the duplex loop path (see FIG. 2D) of the above-cited U.S. Pat. No. 4,456,236 differs significantly from that of the present system. It would apparently block immediate or interleaved feeding of another document to the platen between an inversion and return of the first document as in the present system.

Re a plural document sheet loop per se, Kodak U.S. Pat. No. 4,179,215 issued Dec. 18, 1979 to C. T. Hage is noted. It is clearly not the system disclosed herein.

Xerox U.S. Pat. No. 4,468,114, and the same disclosure in U.S. Pat. No. 4,466,733 issued Aug. 21, 1984 to Susan Pels, disclose, by way of further background, special higher productivity processes for RDH simplex/duplex copy processing for small document sets (with charts and algorithms).

Other art on duplex document handlers for copiers with various duplex document inverters and return paths (including various ones in which the document may be inverted and returned directly to the platen) includes IBM TDB Vol. 14, No. 5, Oct. 1971, p. 1547; U.S. Pat. No. 4,176,945, issued Dec. 4, 1979 to R. C. Holzhauser et al; U.S. Pat. No. 4,278,344 issued July 14, 1981 to R. B. Sahay and its cited references; the above U.S. Pat. No. 4,456,236 issued June 26, 1984 to M. H. Buddendeck and its cited references; and U.S. Pat. No. 4,579,325 issued Apr. 1, 1986 to T. S. Pinckney et al and the list of patents referenced therein in Col. 3, line 39 through Col. 4, line 21; and U.S. Pat. No. 4,411,517 issued Oct. 25, 1983 to W. G. Gerken (re the Xerox "9900" copier RDH); and Wick U.S. Pat. No. 4,066,252. Compatible or dual mode RDH/SADH DH's with architecture commonality are known from some of these and other references, and products. An RDH which may alternatively be used to directly recirculate a single large document without restacking is disclosed in U.S. Pat. No. 4,469,436 issued Sept. 4, 1984 to J. A. Jones, et al.

Some backgrouldprior art on trayless sub-cycle loops for duplexing copy sheets in general includes Xerox Corporation U.S. Pat. No. 4,035,073 issued July 12, 1977 to George DelVecchio (see especially the "Table"); and Kodak U.S. Pat. No. 4,264,183 issued Apr. 28, 1981 to M. Stoudt. A trayless copy sheet loop for a duplexing system is also in U.S. Pat. No. 4,453,819 issued June 12, 1984 to K. Wada et al (Minolta), or related U.S. Pat. No. 4,453,819; Xerox U.S. Pat. No. 4,660,963 issued Apr. 28, 1987 to D. J. Stemmle, and art cited therein; IBM U.S. Pat. No. 4,488,801 to Gibson; and Mead U.S. Pat. No. 4,453,841 to Boblick. Also, Xerox Disclosure Journal Vol. 10, No. 3, pp. 147-8, May/June 1985. IBM EPO Application No. 0 114 966 A1 by D. K. Gibson, published 08.08.84, and based on U.S. Ser. No. 455,368, filed 03.01.83 on "Maximum Throughput Duplexing System for Xerographic Machines" is of further background interest for another copier for filling a closed loop duplex path with a sequence of first side copy sheets.

Recent patents of particular interest as showing copiers with a choice or selection of trayless versus duplex tray duplex paths include said Xerox Corporation U.S. Pat. No. 4,660,963 to D. Stemmle, issued Apr. 28, 1987 (also noting particularly the claims of its divisional U.S. Pat. No. 4,708,462, issued Nov. 24, 1987), and Canon U.S. Pat. No. 4,777,498 issued Oct. 11, 1988 to T. Kasamura et al and based on Japanese priority applications Nos. 102448 and 9 filed May 14, 1985 (noting especially the FIGS. 3 or 7 embodiments).

IBM U.S. Pat. No. 4,639,126 issued Jan. 27, 1987, and filed Nov. 7, 1985, discloses an RDH copying algorithm claiming improved duplex to duplex pre-collation copying productivity. Except for the first and last circulations, it is operating with dual flash (or scan) (2 identical copies at a time of each document) to reduce document handling and DH operating speed. One copy is made on a sheet in the buffer set and the other of the two identical copies is made on a blank sheet.

Of particular interest, two buffer sets in one duplex buffer tray, for RDH duplexing, with a set separator, is disclosed in Xerox U.S. Pat. No. 4,210,319 issued July 1, 1980 to F. R. Hynes. However, these are identical and precollated buffer sets for a precollation or RDH copying system. Said providing of plural buffer sets of copies being precollation duplexed in one buffer tray is also taught in U.S. Pat. No. 4,278,344 issued July 14, 1981 to R. B. Sahay. Copying the same documents twice in a row (dual flash) to make two buffer sets in a special case for simplex/duplex RDH is taught by 4,561,772 issued Dec. 31, 1985 to C. E. Smith.

As noted in various examples in this art, and discussed further herein, there are different requirements for RDH, or pre-collation, copying vs post-collation or multi-copy/sorter, copying. However, the disclosed document handler and copier can compatibly provide either copying mode, as desired, as explained herein.

As xerographic and other copiers increase in speed, and become more automatic, it is increasingly important to provide higher speed yet more reliable and more automatic handling of both the copy sheets and the original or the document sheets being copied. It is desirable to feed and accurately register sheets of a variety of mixture of sizes, types, weights, materials, conditions and susceptibility to damage, yet with minimal jamming, time delays wear or damage by the sheet transporting and registration apparatus, even if the same sheets are automatically fed and registered repeatedly. Maintaining collation of the documents and copies without productivity losses is a particular problem, and has been the subject of sequencing and inverting algorithms, as shown in the art.

The "document" here is the sheet (original or previous copy) being copied in the copier onto the "copy sheet", or "copy". In the terminology herein the term "document" or "document sheet" refers to a conventional sheet of paper, plastic, or other such conventional individual physical image substrate, usually flimsy, relatively difficult to manipulate, and easily damaged, and not to microfilm or electronic images which are generally much easier and faster to store, manipulate, and reorder for imaging presentation in a desired order. Thus, where electronic input of electronic page images in electronic page ordering is intended, rather than a sequence of physical document pages for optical input, it will be specifically so indicated herein. A document "page" herein normally refers to one side of a document, and its set or copying order, irrespective of any actual page numbers, if any. Each duplex sheet is thus normally regarded herein as having two consecutive page numbers corresponding to the two respective images on its opposite sides.

As noted, it is important to keep in mind important known differences between precollation and post-collation copying in automatically making plural collated copies of a set of documents. Precollation copying does not require a sorter or collator, merely an output set stacker and/or finisher. However, precollation with physical documents requires a recirculating document handler (RDH) to plurally recirculate the document set, since only one (or two) copy sets are produced per circulation. In post-collation copying plural sequential copies can be made of each document in a single presentation to the copying station, and thus an RDH is not required, but sorting (collation) of the output copies is required. Duplexing requirements likewise differ between the two copying systems.

Conventional multibin post-collation sorters, including those in which the bins can move up and down as a unit for bidirectional loading, have been known for many years. E.g., the Xerox Corporation "4500" copier sorter, show for example in U.S. Pat. No. 3,788,640 issued Jan. 29, 1974 to D. J. Stemmle. That sorter and others also provides for loading and collating duplex copy output. In sorters either the bins can move to reposition a selected bins at the copier output to receive a copy sheet therein, or the sorter can have sheet transports and/or gates that take the sheets from the copier output and then deflect each sheet into a selected stationary bin. Either type of sorter can be used herewith. However, in either case, conventional sorter bin loading is directly sequential. There is no skipping past unselected bins during bin loading, or moving or opening bins irregularly, or putting uneven numbers of sheets to be collated in different bins, etc.. In conventional sorting only one copy sheet at a time is put in a bin (except for the last bin loaded at the reversal point of a bidirectional sorter, which is then loaded as the first bin), and all the bins being utilized are each sequentially loaded with only one identical copy sheet before any bins are loaded with any different copy sheets.

Further by way of background, there are also "post-collation" copying systems. In these, a limited number of immediately sequential copies are made at a time of each document in the document set and these copies are accumulated collated as completed copy sheet sets in sorter bins of less than the total number of copy sets programmed to be made in a job run, and this is automatically repeated until the entire job is completed. This system is employed in the the Xerox "9900" duplicator, generally described, for example, in U.S. Pat. No. 4,361,393, issued Nov. 30, 1982 to F. A. Noto; and U.S. Pat. No. 4,411,515 issued Oct. 25, 1983 to W. P. Kukucka, et al. However, this is a large and expensive system, and all document pages are copied in order and by the same number of times at each presentation to the platen.

By way of examples of further background on electronic (vs physical) page input and buffering for duplex copying or printing there is noted U.S. Pat. Nos. 4,453,841; 4,099,254; and 4,699,503. Also, Xerox Disclosure Journal publication Vol. 8, No. 1, Jan./Feb. 1983, p. 7, and its description of the Xerox "9700" duplex version laser printer and its trayless duplexing buffer loop operation. The latter and other electronic document page input printers normally provide conventional precollated output, by sequentially making one copy at a time of each document page in repeated copying "circulations" thereof, rather than making plural consecutive identical copies and utilizing sorters and post-collation.

The above-cited U.S. Pat. No. 4,453,841, issued June 12, 1984 to Bobik, et al, (Mead Corp.) is noted for its disclosure of a printer with a batch mode algorithm page order presentation, as particularly shown in FIG. 6 thereof. However, that algorithm appears to operate with the document pages in ascending rather than descending (1 to N) page order, so that printing cannot be started until the entire job is downloaded or buffered, and requiring therefore an electronic storage media of sufficient capacity to hold all the pages of the entire document set or job. If pages are bit-maped, as with mixed graphics, a megabyte or more of memory per page may be required even with data compression and for only 300 spi. Thus, because most computers send information in ascending serial order (starting with page 1), and most printers print in that order, an expensive print server may be required to store and reverse the order of the job before printing. That is disadvantageous for a decentralized environment without a print server available, or without high baud rate downloading connecting lines from a large central computer. First copy out time can be greatly improved with 1 to N page order since printing can start as soon as the first page is received rather than after the whole job is received, which can be a very long time for a multipage job sent over conventional lines, or even coaxial cable, particularly with bit mapped pages. Forward (1 to N) page order is also very helpful for duplexing, since a decision as to the last page being even or odd (simplex) does not have to be made until that last page is downloaded, nor does any separate job handling instruction have to be sent in advance for that last odd (simplex) page situation. The printer can handle that situation on its own.

The present invention, which is claimed in the appended claims, overcomes various of the above-discussed and other problems, and provides various of the above noted features and advantages.

A specific feature of the embodiment disclosed and claimed herein is to provide, in a post-collation copying system for making duplex copies from duplex document sheets, wherein said duplex documents to be copied are sequentially fed from a stack thereof to the copying station of the copier by a document feeder, and plural identical copies are normally made at one time from each document sheet image bearing side by the copier onto copy sheets, and these plural identical copy sheets are normally sorted by being separately placed in the bins of a multiple bin sorter at the output of the copier, and wherein said document feeder is capable of inverting and presenting the opposite sides of duplex document sheets to be so copied after the first sides have been copied, the improvement wherein:

said copier has duplexing buffer tray means adapted to temporarily retain and maintain two separate buffer copy sets of said maximum number of said identical copies made on only one side of copy sheets from two different document sheets;

said document feeder has a duplex document return loop path for inverting and returning the document sheets back to said copying station for copying their opposite sides ahead of other documents fed from said stack, and without returning to said stack, said duplex return loop path having a path length greater than the dimensions of one document sheet and not interfering with said copying station;

and said document feeder and said copier being adapted and operated to sequentially feed and copy the first sides of at least two (first and second) duplex document sheets from said stack, and place the copies thereof in said buffer tray means as two said buffer copy sets, and inverting and returning said first document sheet in said duplex return loop path while copying the first side of said second document sheet, then sequentially copying the opposite sides of said first and second document sheets onto the opposite sides of said buffer copy sets to complete duplex copies and feeding those copies to said sorter bins, and ejecting said first two document sheets after they have been so copied on their opposite sides, then sequentially feeding and copying the first sides of at least two more (different) sequentially fed document sheets and placing the copies thereof in said buffer tray means; and repeating said sequencing for the number of document sheets to be copied from said stack to provide improved efficiency duplex copying.

Further features disclosed and claimed herein include, in a postcollation method of copying both the first and second sides of a plural sheet set of duplex document sheets on a copier for making duplex copies in order from the duplex document sheets, wherein said plural duplex documents to be copied are stacked and automatically fed from this stack to the copying station of the copier by a document feeder, wherein said document feeder is also capable of automatically inverting and presenting the opposite sides of the duplex document sheets to be so copied after the first sides have been copied, the improvement comprising:

making two seperate buffer sets at a time on the first sides of plural copy sheets of plural copies of the first sides of two different duplex document sheets sequentially fed by said document feeder, and temporarily retaining and maintaining these two separate buffer sets in a duplexing buffer tray in the copier;

sequentially inverting and returning duplex document sheets which have been copied on one side via a duplex document return loop path returning those documents back to said copying station without returning to said stack, said duplex document return loop path having a path length greater than the dimensions of one document sheet, for copying the second sides of those documents by feeding them to the copying station again interleaved between the feeding of other documents from said stack to said copying station for copying their first sides, so that at least one said duplex document sheet which has been copied on one side is moving in said duplex return loop path while another document sheet fed from said stack is being copied on its first side;

and copying onto the second sides of said buffer sets the other sides of documents so fed back to said copying station through said duplex document return loop and outputting these completed copies to be sorted by being separately placed in the bins of a multiple bin sorter at the output of the copier;

and repeating these steps until all the document sheets in the document set have been copied.

Further features provided by the system disclosed and claimed herein, individually or in combination, include those wherein said document feeder and said copier are adapted and operated to sequentially copy the first sides of at least two (first and second) sequential duplex document sheets fed from said stack, and place the copies thereof in a duplexing buffer, inverting and returning said first duplex document sheet in said duplex return loop path while copying the first side of said second document sheet; sequentially copying the opposite sides of said first and second document sheets onto the opposite sides of said copies in said duplexing buffer to complete duplex copies, and outputting said copies; sequentially feeding and copying the first sides of at least two more (different) sequentially fed document sheets and placing the copies thereof in said duplexing buffer; and repeating said sequencing to provide improved efficiency duplex copying; and/or wherein said copying of the second sides of the duplex document sheets is by feeding them to the the copying station again but inverted and interleaved between the feeding of other documents from said stack to said copying station for copying their first sides, so that the copying of the set of duplex document sheets is in a non-linear page sequence rather than in direct sequential page order, and so that at least one said duplex document sheet which has been copied on one side is being returned in said duplex return loop path for copying its second side while another document sheet fed from said stack is being copied on its first side.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below. The present invention will be better understood by reference to this description of this embodiment thereof, including the drawing figures (approximately to scale), wherein:

FIG. 1 is a frontal schematic view of an exemplary copier with an exemplary document handler in accordance with the invention; and FIGS. 2(a)–(k) are enlarged frontal schematic views of the document handler of FIG. 1 shown in respective sequential operating sequences corresponding to copier pitches with indicated document and page positions.

Describing now in further detail the specific example illustrated in FIGS. 1 and 2, there is schematically shown in FIG. 1 an exemplary copier 10, with an exemplary DADH document handling system 20, also shown in FIG. 2. Alternative embodiments (variants) are also variously shown in phantom lines. Other than as described herein, the copier may be of any known type, such as those disclosed in above-cited copier patents.

The illustrated document handling system 20 provides for automatically transporting individual document sheets onto and over the conventional platen imaging station 22 of the copier 10 using a belt platen document transport 24 overlying the platen 22. Documents are inputted to one end of the platen 22 and its transport 24 via an input path 25. The documents are sequentially fed thereto from an input stacking tray such as 26, spaced from platen 22 (at one side of, or, alternatively (30') spaced over, the platen). Documents are fed to the platen from the input tray 26 (or 30') by a bottom feeder such as 27 (or 31), or a top feeder such as 28, depending on whether it is desired to have document sheet input stacking face up or face down, and whether 1-N or N-1 order document input is desired or selected. The documents are transported to a registration or copying position over the platen, copied, and then ejected or removed from the platen by transport 24. Further details are shown in the cited and other art. Fully copied documents may be outputted to an output tray 30, or, preferably, returned to input tray 26 by phantom-line path 33 (or returned to tray 30' if that is the input tray), depending on the desired document handling and copying system. Known alternatives have been illustrated here.

For alternative precollation document handling (RDH operation), documents are conventionally stacked in normal collated order in a conventional document input or loading tray (26 or 30') and recirculated to and from that same tray (to and from the platen 22) through an endless RDH recirculation loop (e.g. 25, 22, 72, 33), and are recollated in collated order in that tray by the end of the copying job. Thus, for precollation or RDH operation a separate document output restacking tray such as 30 is not required. It may be seen that the RDH recirculation loop path may be generally conventional, with the important exception of the additional, partially separate, duplexing bypass loop 70, 72, 74 otherwise integral therewith, as explained herein.

As is well known in the art, the DH 20 may also have a separate document input for SADH or stream feeding or interruption or exception copying. That input may be at, for example, 25, 74, or another location.

The DH 20 platen transport 24 here is preferably undirectional, which has document exchange time delay reduction advantages, feeding and registration advantages and other known advantages. A document may thus be fed onto one side of the platen simultaneously with another document being removed from the opposite side of the platen, and by the same platen transport 24. The duplex document return loop provided here from one side of the platen to the other is particularly suitable therewith. However, back-up or document reversal registration and feeding in and out from the same side of the platen, while less preferred, may alternatively be used in some cases.

Referring to FIG. 1, the exemplary copier 10 may be, for example, a well known Xerox Corporation copier, or any other xerographic or other copier, as illustrated and described in various patents cited above and otherwise. The exemplary copier 10 may conventionally include a photoreceptor belt 12 and the conventional xerographic stations acting thereon for respectively charging 14, image exposing 15, image developing 16 with toner, toner image transfer 17, toner cleaning 18, etc. Documents may be illuminated on the platen 22 and conventionally imaged onto the photoreceptor 12 at area 15 through a variable reduction ratio optical imaging system 19 to fit the document images to the selected size of copy sheets.

Although the disclosed document handling system relates to the handling of actual document sheets, alternative electronic document page input or EFE is illustrated by a known type of LED bar page width imager 15' in FIG. 1 for imaging the same photoreceptor 12. As noted, that allows much more flexible page presentation reordering. It also allows for printer or faximile and other alternative usage of the copier.

The control of all copier and document handler and finisher operations is, conventionally, by a machine controller 100. The controller 100 preferably comprises a known programmable microprocessor system, as exemplified by extensive prior art, e.g., U.S. Pat. No. 4,475,156 and its references. Plural but interconnecting microprocessors may be used at different locations. The controller 100 controls all of the machine steps and functions described herein, including all sheet feeding. This includes the operations of the document feeder 20, document and copy sheet gates, sheet feeder drives, any finishers, etc. As further taught in those references, the controller 100 also conventionally provides for storage and comparison of the counts of the copy and document sheets, the number of documents fed and recirculated in a document set, the desired number of copy sets, and other selections by the operator through a connecting panel of control switches. Controller information is utilized to control and keep track of the position of the document and the copy sheets and the operative components of the apparatus by their connection to the controller. For example, the controller may be conventionally connected to receive and act upon jam, timing, positional, and other control signals from various document sheet sensors in the document recirculation path. The controller automatically actuates and regulates the positions of sheet path selection gates depending upon which mode of operation is selected and the status of copying in that mode. The controller 100 also conventionally operates and changes displays on a connecting instructional display panel portion thereof, which preferably includes said operator function selection buttons or switches.

Referring now further to the exemplary copier 10 of FIG. 1, the copier is adapted to provide either duplex or simplex copy sets copied from either duplex or simplex original documents presented by the DH 20, or another image input, on various type of copy sheets. Separate copy sheet trays 32 and 32' are provided, for feeding, via path 34, clean copy sheets from either one selectively. A high capacity paper feeder 36 is also shown, at the right hand side here, with a separate sheet input path merging into path 34. A single sheet bypass entry chute is also shown, entering above the feeder 36. The copy sheets are fed from the high-cap feeder 36 or from a selected one of the paper trays 32 or 32' (or others) to a conventional registration system. The registered sheets are fed via path 38 to the transfer station 17, for the conventional transfer of the xerographic toner image of document images from the photoreceptor 12 to one side of the copy sheet. The imaged copy sheets are then conventionally fed to a roll fuser 42 for the fusing of that toner image thereon. These sheets may pass directly on without inversion through gate 48 and output rollers 44 of the copier to a sorter 46, or to a known finishing module (not shown). The output may be precollated, in which case only a single output stacking tray and/or finisher need be used, and no sorter is required, as is well known.

For inversion for duplexing, a sheet in output rollers 44 may be reversed by reversal of those rollers and fed via the other side of gate 48 to rollers 45 and path 50 into another gate selecting between paths 55 and 51. (An optional inverter 60 may be used instead, and output 44 bypassed by gate 48.) A sheet deflected into a duplex path 51 may stack copy sheets into a duplex buffer tray 52. With duplex buffer tray like 52, for the completion of their duplex copying, the copy sheets in the tray 52 are then conventionally fed seriatim by its bottom feeder 54 back through the sheet paths 34, 38 to transfer station 17 for the imaging of their second or opposite side page image.

Alternately, the trayless duplex buffer loop return path 55 is used for making duplex copies. In this duplexing system, the copy sheets being duplexed, after being printed on one side, are returned (with inversion at 44 or 60) back to the transfer station 17 via a continuous loop paths 50, 55 and 38 for a second side image without stopping or stacking in any tray, as will be further described. This eliminates the intermediate sheet restacking duplexing buffer tray 52 and its reseparating feeder 54 and the space it requires. That eliminates a source of sheet jams and jam clearances as well as known associated hardware such as sheet edge joggers, set separators, and means for tray edge guide resetting for different sheet sizes. This use of a trayless duplex buffer loop can be accomplished without sacrificing productivity because of the disclosed document platen return bypass loop in the document handler and its operation in coordination with the trayless duplex buffer loop, as explained herein. This allows more than one copy sheet to be in the trayless duplexing loop at a time, and allows a sequentially replenished stream of closely adjacent copy sheets therein, to produce output copies at, or substantially at, the full copying rate of the copier in many modes or cases.

Copy sheet output inversion, e.g. to accommodate an optional 1-N order simplex document copying here, can be provided by said reversal of output rollers 44, reversal of rollers 45 in path 50, and then re-reversal of rollers 44, to invert sheets being outputted to sorter 46. Output may be to an alternative single stacking tray or finisher if the output is precollated. The inverter 60 may alternately be provided and utilized to invert sheets being outputted.

For same-side overprinting, or highlight color, that selected copy sheet may be fed back in a non-inverting loop to transfer station 17 via gate 48, rollers 45 and paths 50, 55, (or 51) and 38, as shown.

As an RDH alternative, an alternative of the tray 30 may contain a bottom sheet feeder at its forward end feeding out into the document path 72 to wait station 74, and/or into document platen input path 25, so as to provide a conventional RDH configuration as shown in various of the cited references. In that case, the tray 26 could be eliminated, or used for an SADH input, and tray 30 and its feeder would conventionally provide for both initial document stack loading, and for conventional restacking by the illustrated input, and refeeding for recirculation. This alternative is illustrated in phantom in FIG. 1 by tray 30' and feeder 31.

FIGS. 2(a)-2(k) clearly schematically illustrate one example of one document sheet feeding input and copying sequence for an exemplary set of 5 duplex documents (5 sheets - 10 pages). In this example, in FIG. 2(a), in the first pitch or copying cycle of the copier, the first duplex document sheet (which has page 1 on one side and page 2 on the other side, as illustrated) is fed from the bottom of the stack of documents in the input tray 26. Here, this first document sheet is fed from the bottom of the stack, which is face down, in this example, by the bottom sheet feeder 27. Thus, page 1 is fed directly through the input document input path 25 to be presented face down on the platen 22 in the imaging position, where it can be copied (exposed). In this example, one copy is assumed, therefore one copy cycle. If post-collation copying is being used, then plural copies could be made at this time. For the disclosed DADF and postcollation copying system, with duplex tray 52 being used, the number of copies made at each document page presentation will be the total number selected to be made, or the number of sorter bins, whichever is less.

Figure 2A:
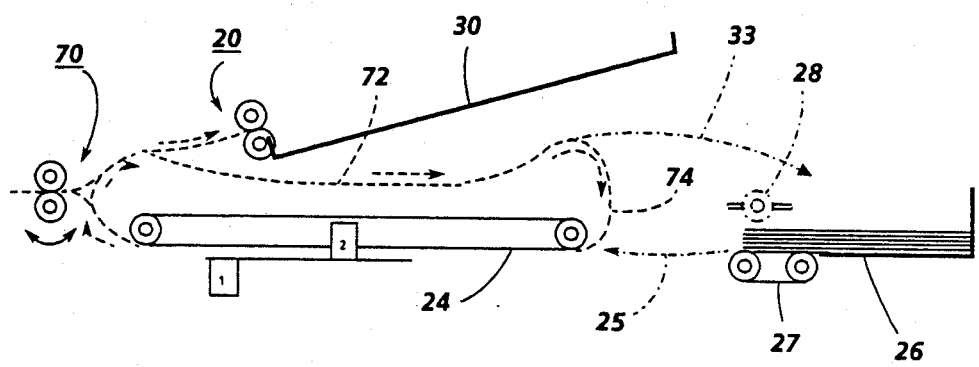
Figure 2B:
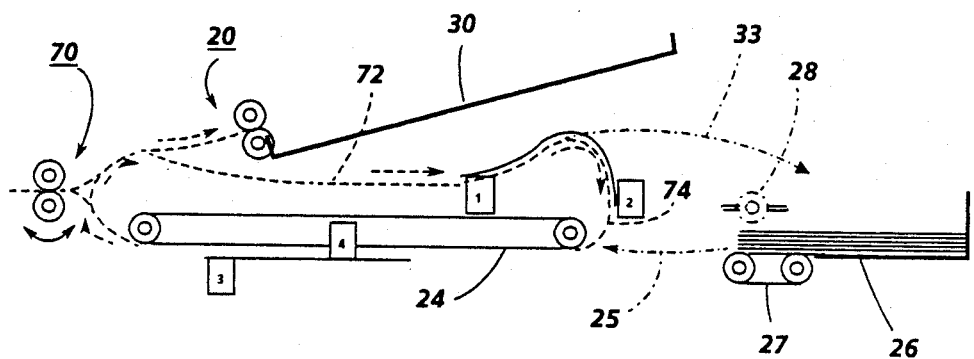

Then, in the second copier 10 pitch, as shown in FIG. 2(b), subsequent to the copying of page 1 this same first document sheet (1/2) is fed off from the downstream or opposite side of the platen 22 into a duplex loop path 72. Note that the opposite side, or page 2, of this sheet is not copied at this time. Simultaneously, in the same copier pitch, the second document sheet (3/4) is fed onto the platen by feeder 27 from the input tray 26 and page 3 thereof is copied. I.e., page 3 on the second document is copied immediately after page 1 on the first document, even though duplex document copying is being provided here.

Note that the first duplex document (1/2) is, simultaneously with this feeding and copying of the second sheet (3/4), continuously moving. That is, this first sheet (1/2) is fed off of the platen, inverted in document inverter 70 and then immediately fed through a return loop path 72 back to a re-entry station 74 adjacent the input side of the platen. The path 72 is merging there with the input path 25 from the input tray 26.

Figure 2C:
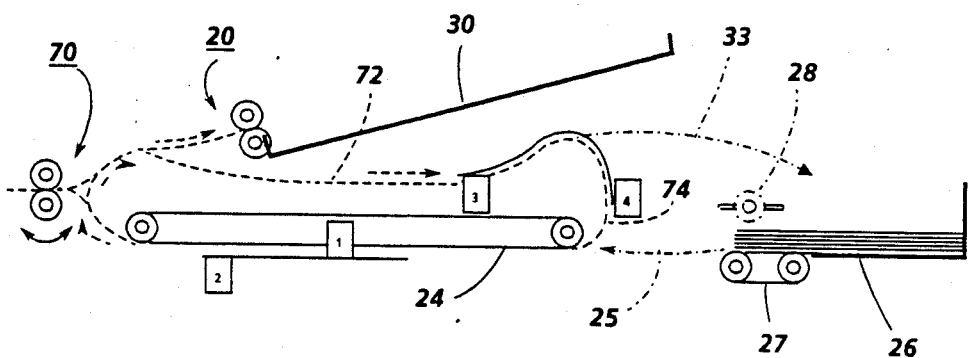

Then, in the next (third) copier pitch or cycle, as shown in FIG. 2(c), the first sheet (1/2) is fed onto the platen again from this re-entry station 74, and side 2 thereof is now copied. Note that this is being done ahead of the next sheet (5/6) in the document stack. The second side copying of the first sheet is being interleaved between the first side copying of the second sheet and the first side copying of the third sheet, i.e., interleaved via path 72 with sheets fed from the stack via path 25.

Also occurring during the same third pitch of FIG. 2(c) is removal of the second sheet (3/4) from the platen and its inversion at 70 and its moving or recycling via path 72 to re-entry station 74, as shown.

In the fourth copier pitch of FIG. (d), the first sheet (1/2), which has now been copied on both sides, is fed off of the downstream end of the platen again, but this time it bypasses inverter 70 and is ejected into the output tray 30, as shown. Alternatively, especially if subsequent recirculation of the documents for pre-collation RDH copying is desired, the documents which have been copied on both sides may be restacked back on top of the stack in tray 26, as shown in the alternative dot-dash line and arrow path 33 extending from path 72 to above the tray 26. In that case the tray 30 may be eliminated. It allows for immediate automatic recirculation of the document set for additional precolated copies from tray 26 in the same manner as described herein. However, the DADF system of final restacking in a separate document output tray 30 is shown here. In either case the final restacking of the document set is in collated order. Note that documents being stacked in output tray 30 are stacked with page 1 facing down, etc., so as to maintain proper collation in restacking. The same would be true for restacking in tray 26 or 30' if either alternative were utilized. Note that also for clarity in these drawings, that sheets which have already been previously stacked in tray 30 are not shown in the figures subsequent to FIG. 2(f) in this illustration.

Figure 2D:
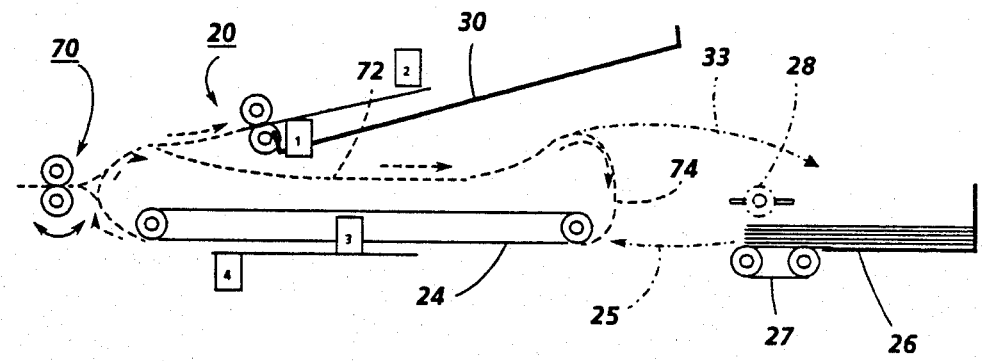

Also occurring during this fourth pitch of FIG. 2(d) is the feeding of the second sheet (3/4) onto the platen from re-entry station 74 and the copying of its backside (page 4).

Figure 2E:
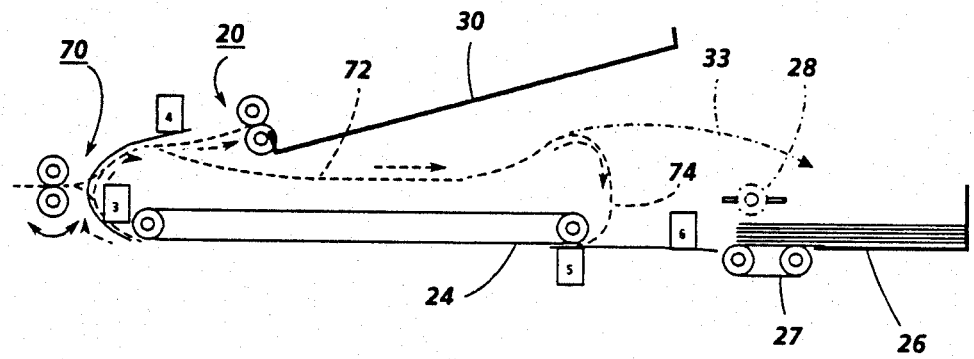
Figure 2F:
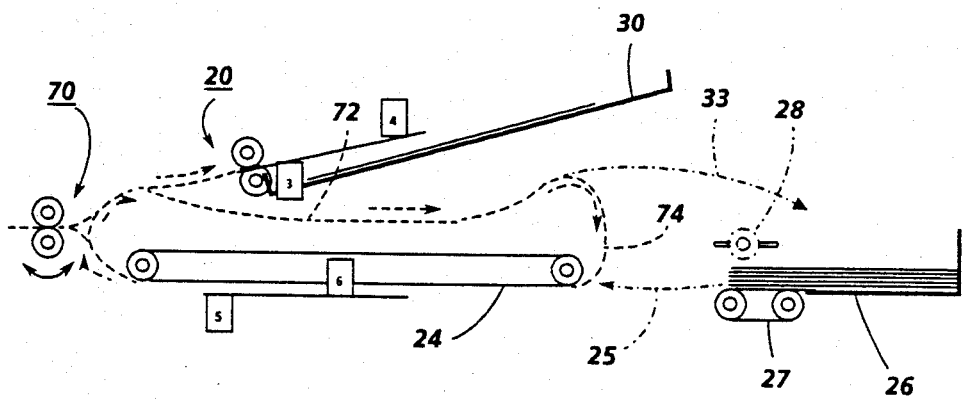
Figure 2G:
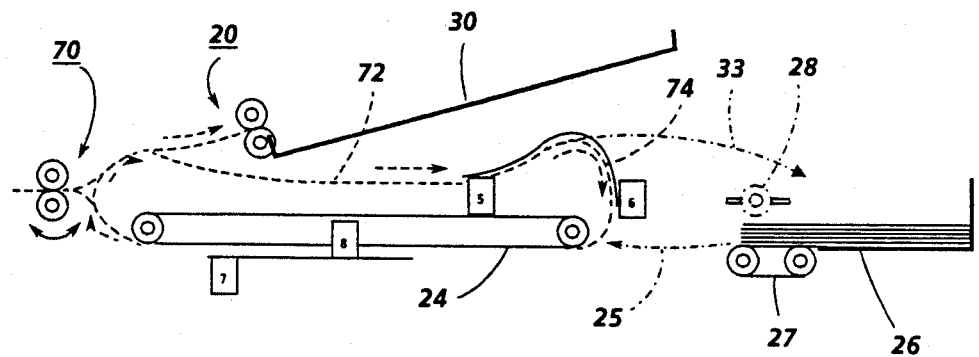
Figure 2H:
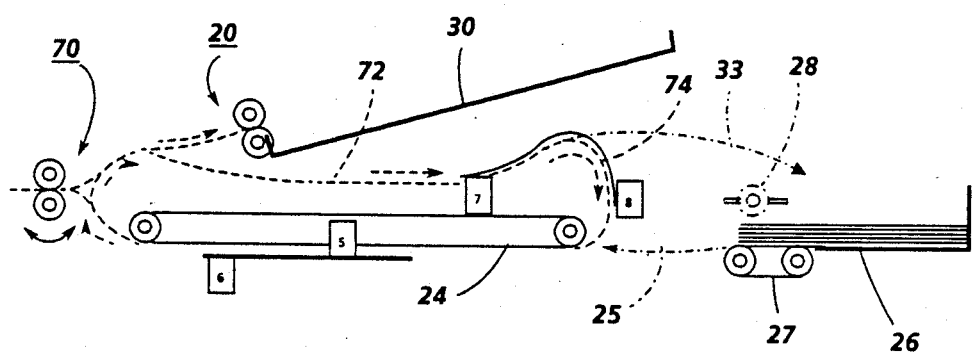
Figure 2I:
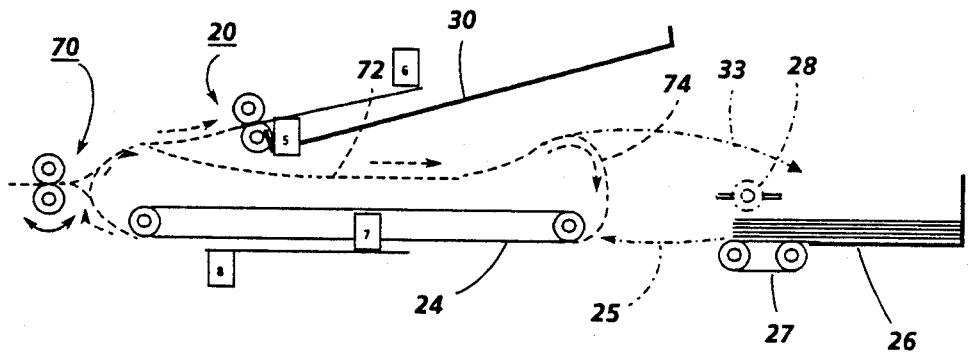
Figure 2J:
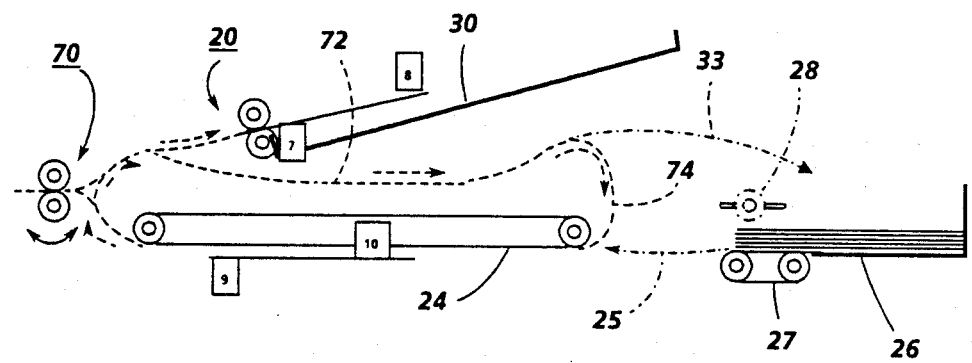
Figure 2K:
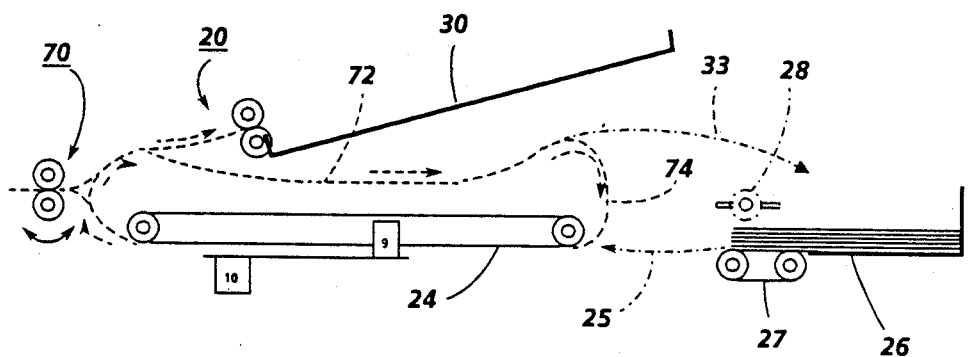

In the next (fifth) pitch, as shown in two sequential FIGS. 2(e) and 2(f) together (for greater illustration), FIG. 2(e) shows the third sheet (5/6) as it is being fed onto the platen (before page 5 thereof is copied), and also shows the second sheet (3/4) bypassing the inverter 70 on its way to being restacked in the tray 30 on top of the preceding sheet (1/2) previously stacked therein. FIG. 2(f) shows, subsequently during the same pitch, page 5 being copied and sheet (3/4) now being restacked in the output tray 30.

Continuing with respective individual pitches of FIGS. 2(g)-2(k), it may be seen that the same sequences are being repeated for subsequent documents and pages. However, it may be seen that in this example, having an odd number, that the last document sheet (9/10) must be inverted and returned to copy its other side without any intervening or interleaved returned sheet. Therefore an extra or skipped (non-copying) pitch may be required in this example to allow time for the feeding through of this last sheet through the full loop of the path 72 of the document handler and its return to the imaging station. This is the movement occurring between the copying positions of FIG. 2(j) and FIG. 2(k). That is, one extra copying cycle or pitch may occur between the copying cycles of FIG. 2(j) and FIG. 2(k), as the next to last copying cycle for the odd document set.

Thus, in the above FIG. 2(a)–2(k) example of one pre-collated copy set being made from a job set of five duplex document sheets (an odd rather than an even set size) it may be seen that the pages thereof are copied in consecutive copier 10 pitches in the order: 1, 3, 2, 4, 5, 7, 6, 8, 9, [skip], 10. If the document set size were even rather than odd, no skip pitch would be needed.

Referring now again to FIG. 1, for duplex copying with a duplex buffer tray system such as tray 52 for the buffering of copies being duplexed, then a known retractable set separator 53 may be provided therein. See, for example, U.S. Pat. No. 4,589,645, and other examples cited therein, including the duplex tray set separator of U.K. No. 2,058,023-A. This set separator 53 may be used in a known manner to maintain separate set separation and integrity between two separate buffer sets in tray 52 of half-duplexed copy sheets being duplexed, as previously noted. For example, in a post-collation mode of operation, using the DADH version of DH 20 and sorter 46 combination, and the buffer tray 52, by using a set separator 53 and a buffer tray 52 with a sheet capacity of twice the maximum number of copies being made at one time from each original, the copier operation may be matched to the above-described document handler operation. For example, for a 40 bin sorter 46, an eighty sheet capacity duplex tray 52 is provided to store up to 40 copies of pages 1's and up to 40 copies of page 3s at one time, respectively separated by the set separator 53. After these page 1's and 3's are duplexed (second side copied), emptying the tray 52, the tray 52 may then be reloaded with a set of page 5's and a separated set of page 7's; etc. Note that this system matches the non-sequential paired copying of document pages with a corresponding paired copy sheet sequencing.

This duplex buffer tray intermediate storage system 52, 53, 54 may be desirable as an option selected automatically in some special modes even if trayless duplexing is used in other modes. For example, for making a large number of post-collation copies at once, with a high capacity sorter, or even with a pre-collation system, as opposed to utilizing the semi-immediate endless duplexing loop path 55 or other such approach. That is, a "batch job" of many duplex copies, especially of only copies of only two simplex document pages, may make it desirable to optionally use the buffer tray 52 in this manner even if a semi-immediate continuous buffer loop duplexing path such as 55 is available for use for other jobs. Manual document placement duplexing is another optional application for tray 52.

Further re duplex copying using a buffer (duplex) tray 52 for duplex copying (vs. a trayless or continuous moving copy loop buffer loop duplex copy path such as 55), in conventional DADH/SORT configurations (for post-collation copying), normally one would copy all of the desired number of copy pages of each document page at once, up to the sorter 46 capacity. For example, if the sorter 46 had ten bins, for a duplex-duplex job up to 10 copies of document page No. 1 will be made at one time while it is on the platen and all 10 pages sent to the duplex buffer tray 52. In such a conventional system, one would then next make 10 copies of that same document's other side, i.e. page No. 2, onto the second side of the 10 page No. 1's as they are fed out of the duplex tray 52. In contrast, in the hybrid sequenced system example herein, 10 copies of document page No. 1 would be made followed immediately by 10 copies of page No. 3 (not page No. 2). Then 10 copies of page No. 2 would be made onto the back of the page No. 1's. As noted above, for this, the duplex buffer tray 52 must be capable of handling two buffer sets, i.e., in this example, holding 20 sheets in two sets instead of the normal single set of 10 for a conventional algorithm.

Now returning to a more general discussion of the subject hybrid document handling system disclosed herein, the following is a summary description of the document handling operation, in somewhat different words. For a set of duplex documents, during the time periods while duplex documents previously copied on one side are being inverted and returned to the platen for copying their opposite sides through the document inversion loop path 72, one or two other, intervening, documents are being copied. This is accomplished by "breaking up" the normal directly sequential copying order of the stack or job of documents into small cyclic copying cycles, and, very importantly, providing these nonlinear page sequences by using the direct platen return or bypass loop 72 path for the documents. The duplex documents are cyclically passed through this duplex return loop path 72. Duplex documents are removed from the platen 22 after they are copied on one side, and inverted by an inverter 70 in that path 72, and returned back to the platen 22 directly by this path 72 (i.e., without being restacked or returned to the tray 26), and reinserted into the document input path 25 ahead of other documents being fed from the job stack in tray 26, i.e., before other documents are copied, but (except for) after at least one other document has been copied on its first side while this prior and now returning document was being inverted and returned through this duplex return loop 72. I.e., the documents are copied in a special intermixed page order sequencing, not directly serially. With this system the copier does not normally have to wait (skip one or more copying pitches) for the time required to turn over and return to the platen a duplex document for copying its other side. Productivity can approach 100%. Note that this duplex bypass or platen return loop path must be at least one document sheet dimension (in the feeding direction) in length, but could be two or even three. The particular cyclic algorithm used must match this loop path length, and also not overfill it, i.e., not exceed its length. Desirably, it returns the documents to the opposite side of the platen from which they exited. This path 72 bypasses the input tray and does not interfere with feeding other sheets to the platen.

Post-collation duplex/duplex copying, i.e., using the DH 20 as a DADF, will now be discussed in further detail with further examples. [Even further examples will be described further hereinbelow, with tables and examples of the coordinated operation of the sorter or collator.] The example here is one using the trayless buffer loop copy sheet duplexing path 55, rather than a duplex buffer tray like 52. Copying may be initiated just as in FIG. 2(a). As one example, assuming a two pitch dedicated duplex document loop 72 and a 3 pitch duplexing copy loop 55, the document pages may be copied in the sequence 1, 1, [skip], 2, 2, [skip], 1, 1, [skip], 2, 2, etc., repeated by the number of post collation copies requested, or the number of sorter bins. The document sheet is inverted during the skipped pitch. Then 3, 3, [skip], 4, 4, [skip]; etc. Note that this is a "dual flash" approach which has one-half the document circulation of an RDH mode of operation. However, if both the document and copy duplex loops have a three sheet pitch or capacity, then a 100% efficient copying algorithm page copying sequence may be used as follows: 1, 3, 5; 2, 4, 6; 1, 3, 5; 2, 4, 6; etc., repeated for the selected copy count and automatically followed by 7, 9, 11; 8, 10, 12; 7, 9, 11; 8, 10, 12, etc., (assuming there are that many documents, and continuing if there are more). In the latter algorithm, 3 documents at a time are recirculating from the platen through loop 72 and back, coordinated with 3 copy sheets copied on one side circulating in the loop 48, 50, 55, 38 to and from the transfer station 17. Both loops are kept filed and no skips are required in each job sub-set of three sheets.

In the principle examples shown herein, the algorithms are for 1-N page order copying, and the DH is fed 1-N, but this is not required. Alternative feeder and tray arrangements for N-1 copying are shown and described herein. Also, these specific examples show a 3 pitch or 3 sheet duplex copy loop in the copy handling model (CHM), (from transfer station 17 and back). They also show a 2 pitch DH duplex loop, (that is, from copying a document it takes approximately 2 copy machine pitches to return it to the platen ready to copy the opposite side.) This is not required either. In fact, as shown, these two duplex loop paths 72 and 55 (for the documents and the copies, respectively) are ideally of equal length, i.e., both being approximately 2, or preferably 3 spaced sheet dimensions in path length. In any case, the algorithm must match the two loops together for maximum efficiency (productivity).

Note that duplex copies can also be made from simplex originals, desirably using the same copier configurations and paper paths and the same special document feeder for non-sequential simplex document feeding, only without requiring document inversion. Examples are disclosed herein.

Trayless duplex operation in simplex/duplex mode for a post-collation (DADF/SORT) system will be described below. The key factors in formulating a desired efficient sequence or algorithm are the CHM (copy handling module) duplex buffer loop size in terms of pitches (effective copy sheet loop path length), the document exchange time, and the paper path architecture (i.e., 1-N or N-1 page order). The major change in algorithms from a conventional duplex tray system stems from the requirements of the paper path loop architecture in the CHM for trayless duplex. For trayless duplex, a copy sheet being duplexed must travel completely around the duplex loop continuously (that is, without overlapping, stacking, stopping, or being held in a tray), and be inverted in order to have received both images by the end of that loop. The loop is inherently FIFO. This configuration requires the proper second side image for a duplex copy to be on the platen ready for scanning by the time the copy sheet with the first side image is inverted and is transported by the trayless loop back to the transfer position again, to avoid a wait or delay. Also, the number of document page images duplex copied in directly sequential order is limited by the loop length. This means that for efficient sequencing of a three pitch duplex loop CHM, the second side image must be on the platen on the third pitch length after the first scan of the side one image.

First describing a conventional or "unshuffled" output order for trayless post-collation duplexing, for simplex documents, desirably they are scanned in sequential order. However, any single document can only be scanned as many times in a row at one time as allowed by the CHM loop size. Thus for a 3 pitch CHM, documents can only be scanned a maximum of three times in a row, unless it is the last document of an odd set, in which case the last copy sheet can be simplexed, and therefore does not need to use the duplex loop or be limited thereby. For example, for a 3 simplex document, 4 copies job, assuming a 3 pitch CHM and 1-N architecture, simplex document 1 is scanned three times and then put into the return loop in the document handler. Simplex document 2 is then brought onto the platen and scanned three times and put into the DH return loop. All of the side two images meet up with their side one copy sheets and are available for output. However, since 4 copies are desired, document 1 must be brought back onto the platen from the DADF return loop and scanned once more. Document 1 can then be output stacked. Then document 2 is brought back onto the platen via the return loop. After the third pitch, there is a two pitches skip. After the fourth scan of document 1, document 2 is scanned and then stacked. Thus we now have four duplex copies (1/2) of documents 1 and 2. Document 3 is then brought onto the platen and scanned four times and copied as simplex copies directly outputted since there is no reverse image to go onto these final copy sheets. These simplex copies of document 3 are inverted before exiting the CHM so that they are properly collated when stacked in the sorter bins.

There is no additional complexity for sorter operation using normal serial order "unshuffled" sequencing. Conventional serial sorter bin filling order may be used.

Considering now unconventional or "shuffled" sorter precollation copying algorithms with trayless duplex, because there can be significant productivity losses associated with unshuffled trayless duplex, there is desirably an option to "shuffle" the copying sequence to eliminate some skipped pitches, as will be further explained herein. But a requirement of any desirable sequencing is that both the copy output and the document restack must be properly collated at the end of the job.

As one example, using the above 3 document 4 copy job example, but for a "shuffled" trayless operation, simplex document 1 is scanned three times and then brought around the DH return loop. Document 2 is brought onto the platen and scanned three times to meet with the side 1 copy sheets. Document 1 is than brought back on the platen, scanned for the fourth time, and restacked. Now, instead of skipping two pitches as in the unshuffled operation, document 3 is brought on the platen, scanned twice, and brought around the return loop. On the next pitch, document 2 is brought back to the platen, scanned, and restacked. Document 3 is then brought onto the platen from the return loop and scanned twice to complete the job.

However, such "shuffled" algorithms need a more sophisticated, non-conventional, sorter operation because the output is not collated as it exits the CHM. This is further described later herein.

Considering now a simplex/duplex pre-collation (a conventional RDH/Finisher operation) copying system, in a conventional copy output order or "unshuffled" mode, the simplex documents are restacked in their conventional collated order in every cycle. For a three pitch CHM, the requirement that the second side image be on the platen on the third pitch after side one is imaged is the primary consideration for the algorithm. For a 3 simplex document job, document 1 is fed onto the platen, scanned once, and restacked. Document 2 is fed onto the platen, but not imaged because the copy sheet of side one has not yet been inverted and brought back to transfer through the 3 pitch duplex buffer loop. Document 2 is then brought around the document handler return loop. Document 3 is brought onto the platen, scanned once and brought around the return loop. Document 2 is transported to the platen from the return loop, scanned once and restacked. Document 3 is then brought onto the platen (no image necessary), and restacked. This sequence would repeat for any number of sets desired.

The "shuffled" scheme for pre-collation or RDH/FIN operates much the same way as unshuffled. The major difference is the way simplex documents sets are restacked. For unshuffled, as noted above, the document set is always restacked in collated order. For shuffled, the document set is restacked in shuffled order for the second through n minus 1 passes. For a three document, three set job, documents on the first pass would be scanned as in the above described unshuffled mode, but restacked in the order 1, 3, 2, by using the return loop path of the document handler. The subsequent passes (copying circulations of the document set) up to n minus 1 would be made presenting the documents in this uncollated 1, 3, 2 order. On the nth circulation or pass, the documents would be recollated before restacking, using the DH return loop path.

Discussing now the output sequencing for trayless duplex operation for post-collation or DADF/SORT mode, and considering first simplex input to duplex output operation, there are two types of copying and output sequencing which can be utilized. They are described here as "shuffled" and "unshuffled".

There is no additional complexity for sorter operation using "unshuffled" trayless duplex algorithms. The final CHM output is always suitable for conventional collation, i.e., always in conventional directly sequential page order, and conventional directly sequential bin loading sorter operation can be utilized.

For "shuffled" trayless duplex sorter output, because the output page order is not always directly sequential for this copying mode, more intelligence must be provided for the sorter operation. Unconventional, non-directly-sequential, sorter bin selection for the copier output is used to provide proper post-collation. The easiest way to understand this operation is through examples. Below is an algorithm table example for S/D mode, for a three page simplex document and four duplex copies job in a "shuffled" DADF/SORT mode with a copier with a 3 sheet three pitch.

From the table below, one can see that the first three duplex copy sheets are the same 3 identical pages 1/2, outputted from the copy handling module (CHM) in pitches 4, 5, and 6. Therefore, the sorter initially operates in the usual fashion for these three sheets, that is, serially increments one bin for each copy output and puts one copy sheet in each of bins 1, 2, and 3.

| PITCH  | 1 | 2 | 3 | 4   | 5   | 6   | 7 | 8 | 9 | 10  | 11 | 12 |
|--------|---|---|---|-----|-----|-----|---|---|---|-----|----|----|
| DADH   | 1 | 1 | 1 | 2   | 2   | 2   | 1 | 3 | 3 | 2   | 3  | 3  |
| CHM    | 1 | 1 | 1 | 2   | 2   | 2   | 1 | 3 | 3 | 2   | 3  | 3  |
| OUTPUT |   |   |   | 1/2 | 1/2 | 1/2 |   | 3 | 3 | 1/2 | 3  | 3  |
| BIN    |   |   |   | 1   | 2   | 3   |   | 1 | 2 | 4   | 3  | 4  |

But for N copy sets, N available bins are needed in the sorter. Thus for this 4 copy set example, four bins must be filled. But here the fourth, fifth, and sixth pitches have outputted only three duplex copies of sides one and two, and the sorter has incremented to only bin three. However, after again, in pitch 7, transferring another side one image from the DADH into the internal CHM duplex buffer loop path, two simplex copies of page 3 can be outputted next in pitches 8 and 9 (because this is only a 3 page document set example). One cannot output these page 3 copies to sorter bin four since the necessary preceding copy (a duplex copy of sides one and two) for that set is not yet placed in bin four. (That would be mis-collation.) Therefore, the sorter must re-position to accept the output of these two page-three copies into bins one and two, successively in pitches 8 and 9. This completes the first two copy sets in those two copy bins. Next, the last duplex copy of pages one and two has passed through the CHM duplex buffer loop and is ready for output in pitch 10. Therefore, the sorter, previously positioned at bin two, must now be moved so that bin four can accept that output. Finally, the last two simplex copies of page three are outputted in pitches 11 and 12. For these final copies, the sorter can first remain at bin four and then increment to bin three to complete the remaining sets, or vice-versa.

Note that this table is simplified, in that the actual output and bin filling may occur a partial or full pitch after image transfer, due to the paper path transit time therebetween. Also, DADH document image presentation and corresponding CHM copy production of that page are shown in the same pitch, even though there is normally photoreceptor travel time between the imaging and transfer stations.

Considering now post-collating the output from trayless duplex from duplex originals, similar to the S/D case above, non-directly sequential sorter operation is needed for the D/D trayless duplex "shuffled" algorithms. The algorithm table for a two sheet duplex document (4 pages or sides), three duplex copies job is shown below:

| PITCH  | 1 | 2 | 3 | 4   | 5   | 6   | 7 | 8 | 9 | 10  | 11  | 12  |
|--------|---|---|---|-----|-----|-----|---|---|---|-----|-----|-----|
| DADH   | 1 | 1 | 3 | 2   | 2   | 4   | 1 | 3 | 3 | 2   | 4   | 4   |
| CHM    | 1 | 1 | 3 | 2   | 2   | 4   | 1 | 3 | 3 | 2   | 4   | 4   |
| OUTPUT |   |   |   | 1/2 | 1/2 | 3/4 |   |   |   | 1/2 | 3/4 | 3/4 |
| BIN    |   |   |   | 1   | 2   | 1   |   |   |   | 3   | 2   | 2   |

In this example, during or just after the fourth and fifth pitches, two identical duplex copies (1/2) of sides one and two are respectively outputted to bins one and two. The next duplex copy sheet (3/4) ready for output contains page three and page four images. The system cannot have bin three accept this (3/4) copy sheet since that copy set will first need a sheet with pages 1/2, which is not yet in this bin. Therefore, bin one [or bin two] must be put back in position to accept this (3/4) output sheet. This completes one copy set. The next copy sheet to leave the CHM output is the last duplex copy of sides one and two. This is placed in bin three in pitch 10. Last, the final two duplex copies of sides three and four are successively outputted to bins two and three, to complete this job, with this duplex buffer loop.

The following provides another example of an alternative hydrid output duplex copy collation system in which collated copy sets output is provided in bins of an otherwise conventional sorter by unconventional order document copying and coordinated unconventional or "shuffled" (irregular) bin selection (bin movement or bin selector gate deflection), without requiring a duplex buffer tray. I.e., using an endless loop duplex loop path for copy sheets being duplexed. Assume in this example a copier with a 2 sheet CHM duplex buffer loop path length, and that 3 duplex copy sets are to be made from a six page (three sheet) duplex document, in 1 to N order. Document page one of document sheet one is put on the platen by the DH from the input tray and copied once. That first document sheet (1/2) is then put into the DH duplex return loop. The copy of page one is put into the CHM duplex buffer loop. Then document page 3 is copied once (by the second duplex document sheet being fed onto the platen) and the copy of page three is put into the CHM duplex buffer loop. Note that document sheet 1/2 was in the DH duplex return loop and being inverted while (during the time) document page three was being copied. The second document sheet (3/4) is then put into the DH duplex return loop. Then document page two of document sheet 1/2 is put on the platen by the DH duplex return loop and copied once onto the back side of the copy of page one coming back out of the CHM duplex buffer loop, and this completed copy sheet is exited or outputted from the copier. Then document page four of document sheet two is put on the platen by the DH duplex return loop and likewise copied onto the back side of the copy of page two and outputted. These first two copy sheets are both exited in that order sequentially into the same, single, sorter bin, so that this first sorter bin now contains copy pages 1/2 and 3/4. This may then be repeated two more times to fill two more bins with the same pairs of two different duplex copy sheets (since only three sets of copies are desired in this example). Then, document page 5 on the third and final document sheet 4/5 is fed onto the platen and copied once, turned over, and copied on its other side (page 6), and this is repeated three times to produce the final 3 copy sheets 5/6 which are each placed in one of the same three bins to complete a copy set 1/2, 3/4, 5/6 in each bin, to complete this job.

It is significant to generally note that in the system being described here that plural sheet partial copy sets of different pages (not identical copies) corresponding in number to the sheet capacity number (length) of the duplex buffer loop are being put into each of separate bins, and this is repeated by the total number of copy sets desired (selected to be made), and then, in another copying cycle, putting additional partial copy sets, from the additional document pages, into the same bins, to combine with the previous partial copy sets in those bins to complete a collated set. I.e., plural partial copy sets are made and placed in bins, then additional partial copy sets are made and placed on top of them in the same bins to get a whole copy set in each bin and therefore a whole job. This algorithm is quite efficient, especially for a larger document set. There are no skipped pitches until the copying of the last (final) documents in the documents set, and then only for cases where either the number of documents in the set divided by the CHM duplex buffer loop pitch length is not an integer, so that the CHM duplex buffer loop cannot be kept full for the copying of the last documents in the set, or where the number of documents in the set divided by the DH duplex return loop path length in document sheets is not an integer, so that the DH duplex return loop path cannot be used while another document page is being copied.

Note that the disclosed hybrid or "shuffled" post-collation (sorting) algorithms for trayless duplexing vary considerably between specific embodiments. The described examples here for a 2 vs a 3 sheet pitch length CHM duplex buffer loop are quite different, for maximizing their respective efficiencies. However variable, as may be seen from the examples, very unconventional copying orders and sorter bin loading orders are utilized in all the disclosed cases. During a copying job there can be desired variations in the number of copies made at one time in direct sequence, the number of bins loaded in direct sequence, the number copies loaded into a bin in direct sequence without changing or moving the bin being loaded, and the order of loading the bins, which is irregularly bidirectional and skips past intermediate bins without loading them for some copies at certain points in the sequencing. The bins are not loaded with copy sheets in a directly sequential bin order as in a conventional sorter, hence the use of the terms "hybrid" or "shuffled" output. Likewise the document pages being copied to produce these unconventionally sorted copies are not copied in a directly sequential or collated order as in a conventional document handler, hence the use of the terms "hybrid" or "shuffled" document input.

While the embodiments disclosed herein are preferred, it will be appreciated from this teaching that various alternatives, modifications, variations or improvements therein may be made by those skilled in the art, which are intended to be encompassed by the following claims.

We claim:

1. In a postcollation method of copying both the first and second sides of a plural sheet set of duplex document sheets on a copier for making duplex copies in order from the duplex document sheets, wherein said plural duplex documents to be copied are stacked and automatically fed from this stack to the copying station of the copier by a document feeder, wherein said document feeder is also capable of automatically inverting and presenting the opposite sides of the duplex document sheets to be so copied after the first sides have been copied, the improvement comprising:

making two separate buffer sets at a time on the first sides of plural copy sheets of plural copies of the first sides of two different duplex document sheets sequentially fed by said document feeder, and temporarily retaining and maintaining these two separate buffer sets in a duplexing buffer tray in the copier;

sequentially inverting and returning duplex document sheets which have been copied on one side via a duplex document return loop path returning those documents back to said copying station without returning to said stack, said duplex document return loop path having a path length greater than the dimensions of one document sheet, for copying the second sides of those documents by feeding them to the copying station again interleaved between the feeding of other documents from said stack to said copying station for copying their first sides, so that at least one said duplex document sheet which has been copied on one side is moving in said duplex return loop path while another document sheet fed from said stack is being copied on its first side;

and copying onto the second sides of said buffer sets the other sides of documents so fed back to said copying station through said duplex document return loop and outputting these completed copies to be sorted by being separately placed in the bins of a multiple bin sorter at the output of the copier;

and repeating these steps until all the document sheets in the document set have been copied.

2. The method of copying of claim 1 wherein said document feeder and said copier are adapted and operated to:

sequentially copy the first sides of at least first and second sequential duplex document sheets fed from said stack, and place the copies thereof in said duplexing buffer tray, inverting and returning said first duplex document sheet in said duplex return loop path while copying the first side of said second document sheet; sequentially copying the opposite sides of said first and second document sheets onto the opposite sides of said copies in said duplexing buffer tray to complete duplex copies, and outputting said copies; sequentially feeding and copying the first sides of at least two more sequentially fed document sheets and placing the copies thereof in said duplexing buffer tray; and repeating said sequencing to provide improved efficiency duplex copying.

3. The method of copying of claim 1 wherein said copying of said set of duplex document sheets is in a non-linear page sequence rather than in direct sequential page order.

4. The method of copying of claim 3 wherein said set of duplex document sheets are recirculated after copying back to a single, original, stack thereof in a recirculating document handler which is adapted for normally recirculating documents directly sequentially but has a bypass path for said non-linear page sequence copying of said duplex document sheets.

* * * * *